US008572749B2

(12) United States Patent
Venketeshwar

(10) Patent No.: US 8,572,749 B2
(45) Date of Patent: Oct. 29, 2013

(54) INFORMATION SECURITY CONTROL SELF ASSESSMENT

(75) Inventor: Balaji Venketeshwar, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 194 days.

(21) Appl. No.: 13/229,108

(22) Filed: Sep. 9, 2011

(65) Prior Publication Data

US 2013/0067581 A1 Mar. 14, 2013

(51) Int. Cl.
- *G06Q 10/00* (2012.01)
- *G06Q 40/00* (2012.01)
- *G06Q 30/00* (2012.01)
- *G06F 11/00* (2006.01)

(52) U.S. Cl.
USPC .......................... 726/25; 705/7.25; 705/14.2

(58) Field of Classification Search
None
See application file for complete search history.

(56) References Cited

U.S. PATENT DOCUMENTS

| 6,912,502 B1 * | 6/2005 | Buddle et al. ............... 705/7.41 |
| 2003/0229525 A1 * | 12/2003 | Callahan et al. ............... 705/7 |
| 2010/0198631 A1 * | 8/2010 | Edwards et al. ............... 705/7 |

* cited by examiner

*Primary Examiner* — Andrew L Nalven
*Assistant Examiner* — Quy Pham
(74) *Attorney, Agent, or Firm* — Banner & Witcoff, Ltd.; Michael A. Springs

(57) ABSTRACT

Apparatuses, computer readable media, methods, and systems are described for identifying risk assessment queries for assessing risk of a process, providing the identified risk assessment queries to a client device for presentation, receiving response data from the client device comprising responses to the risk assessment queries, determining response values for at least some of the risk assessment queries based on the received response data, and calculating a process risk metric based on the determined response values.

17 Claims, 5 Drawing Sheets

300

Risk Assessment Query Form

302

304a          306a   Yes   No    306

| Question | Yes | No |
|---|---|---|
| Is there a firewall installed on the network? | ☑ | ☐ |
| Are anti-virus programs installed on the servers used to store sensitive data? | ☑ | ☐ |
| Are anti-spyware programs installed on the servers used to store sensitive data? | ☐ | ☑ |
| Is sensitive data encrypted? | ☐ | ☐ |
| Is wireless network access password protected? 304b | ☐ | ☐ |
| Are wireless network communications encrypted? | ☐ | ☐ |
| Do sub-manager level employees have access to customer social security numbers? | ☐ | ☐ |
| Do sub-manager level employees have access to customer personal information (phone number, email, address, etc.)? | ☐ | ☐ |
| Are dongles required for access to sensitive material? | ☐ | ☐ |
| Are incoming emails scanned for viruses? | ☐ | ☐ |
| Is client information backed up? | ☐ | ☐ |
| Are information backups stored in a physically separate location? | ☐ | ☐ |

INFORMATION SECURITY CONTROL SELF ASSESSMENT

BACKGROUND

Businesses in many customer service and consumer retail sectors often handle sensitive customer information such as credit card numbers, bank account numbers, social security numbers, phone numbers, addresses, email addresses, birthdates, passwords, and other sensitive information. This information may often be stored in databases owned by a business and/or transported across networks (LANs, WANs, the Internet, or the like). Often, this customer information may be used in various processes. For example, a customer's credit card information and address may be used while processing a credit card transaction for an online purchase. As another example, a customer's social security number and date of birth may be used as part of a credit check process for determining if a new bank account, line of credit, or other financial product may be provided to the customer. Due to the sensitive nature of this customer information, security of such information may be vital.

Often, processes that involve the handling, processing, storage, or communication of sensitive customer information may include a level of risk. In some instances, it may be difficult to identify risk factors associated with a particular process or set of processes. It may also be difficult to identify processes or sets of processes that may be in need of risk reduction measures.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to aspects of example embodiments, apparatuses, computer readable media, methods, and systems are described for identifying risk assessment queries for assessing risk of a process, providing the identified risk assessment queries to a client device for presentation, receiving response data from the client device comprising responses to the risk assessment queries, determining response values for at least some of the risk assessment queries based on the received response data, and calculating a process risk metric based on the determined response values.

Aspects of the embodiments may be provided in at least one computer-readable medium and/or memory storing computer-executable instructions that, when executed by at least one processor, cause a computer or other apparatus to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which:

FIG. 3 illustrates an example graphical user interface (GUI) presented by a user terminal to present risk assessment queries and elicit responses to the risk assessment queries from an end user in accordance with example embodiments.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
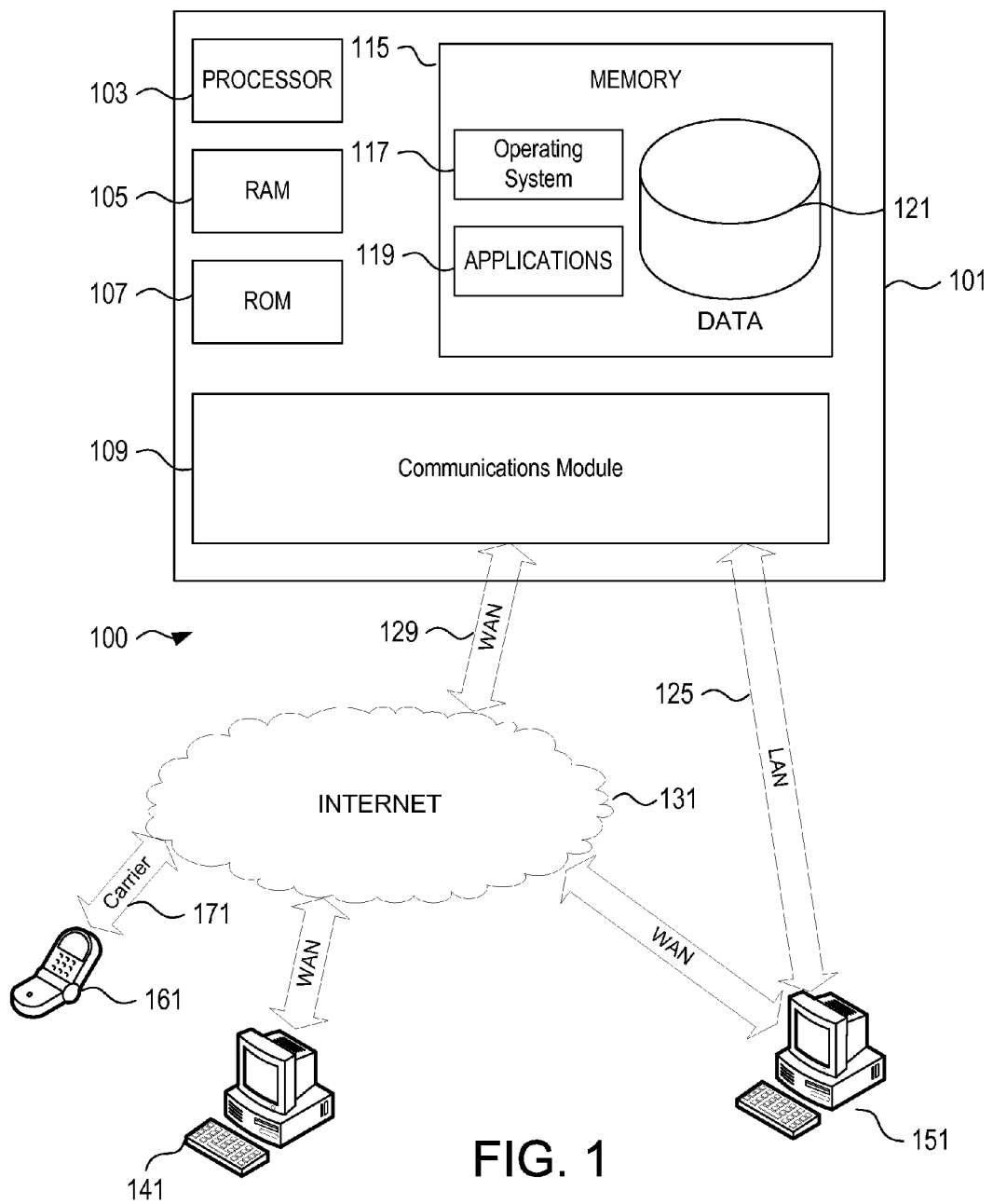
FIG. 1 shows an illustrative operating environment in which various aspects of the disclosures may be implemented in accordance with example embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, and the like to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 125 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that may be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, an apparatus, a data processing system, as a computer-readable medium storing computer-executable instructions, combination thereof, or other implementations. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
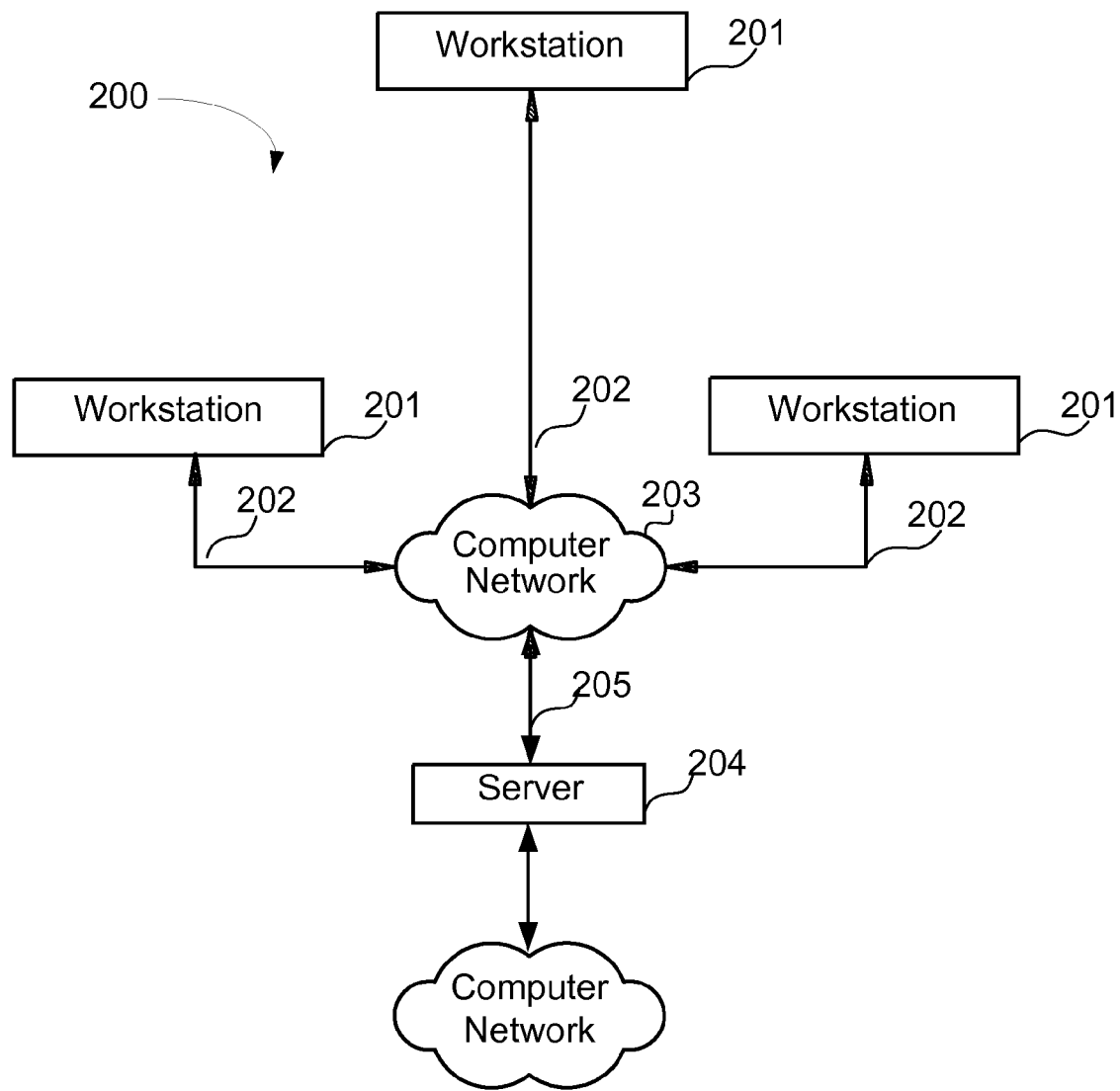
FIG. 2 is an illustrative block diagram of workstations and servers that may be used to implement the processes and functions of certain aspects of the present disclosure in accordance with example embodiments.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

In general, information pertaining to the security of sensitive information may be received from one or more process owners or users. The information may be elicited by presenting a series of questions to a process owner or user. In some implementations, the received information may be related to the processing or security of sensitive information, such as social security numbers, credit card numbers, bank account numbers, passwords, customer information (address, phone number, email, and the like) or other sensitive information. The received information may be used to assess the risk associated with a particular process or data handling scheme. The assessed risk for a particular process may be compared to the relative risk levels identified for other processes. This comparison of identified risk levels may be used to prioritize risk treatment among several processes, or may be used to identify one or more processes that may be in need of attention in order to reduce risk. In some implementations, resource prioritization may be performed to mitigate the risk for selected high risk processes. This may involve changing processes or controls related to processes.

The methods for identifying risk associated with processes (as described below in greater detail) may be adjusted to meet the dynamic nature of varying processes and process characteristics to effectively identify the nature and sensitivity level of data associated with processes. Existing process controls may be evaluated for risk, and controls may be modified, or new controls may be put in place to mitigate risk associated with a particular process. Additionally, risk assessment methods may be used to create a control environment which in turn facilitates compliance with regulations and/or industry standards. Benefits may include proactive identification of potential security gaps and information risks in respective processes; structured sharing of security gaps and information risks with process owners; and development of risk mitigation procedures. Additionally, process owners may be enabled to have a closer insight into risk factors associated with a process and justifications behind changes to controls or processes to reduce risk.

Turning now to FIG. 3, a graphic user interface (GUI) 300 includes a Risk Assessment Query Form (form) 302 for eliciting information from a process owner. The GUI 300 may be presented to a user on a graphic display of a desktop computer, laptop computer, mobile device, or other computing device. For example, the GUI 300 may be displayed on a display screen in communication with, or incorporated into the computing device 101 or the computing device 151 shown in FIG. 1. The GUI 300 presents the form 302 to a user. The form 302 includes a number of queries 304. The queries may be presented to the user to elicit input from the user. In the example shown the queries 304 are intended to elicit yes/no responses. The user may indicate the answer to a query 304 by selecting one of a number of checkboxes 306. For example, the user may indicate a response to a query 304a by selecting a checkbox 306a (e.g., by using a mouse to position a cursor over the checkbox 306a and "click" on the checkbox 306a). In response to the user input, the GUI 300 may display a checkmark 308 in the checkbox 306a to indicate that the user has indicated a "yes" answer to the query 304a. In some implementations, means other than checkboxes may be used to indicate a user's answers to the queries 304. For example, the form 302 may include radio buttons for receiving and indicating user responses. As another example, the form 302 may include text boxes for receiving user input. As yet another example, the form 302 may include pull down boxes to allow a user to select from a number of preselected answers (e.g., yes, no, not applicable, or the like).

In addition to the queries 304 shown in FIG. 3, below are some example queries to solicit information about one or more processes.

Query 1: Has access control been applied on a shared/network folder (read/write/full control/modify) for ensuring access only to authorized associates and is access to a folder being revoked on transfer/attrition of an associate?

Query 2: Does a process store data on a Card Verification Value (CVV) or personal identification number (PIN) after the intended usage criteria is fulfilled?

Query 3: Is customer/associate confidential information being sent over email to any external email address, including vendors/contractors having an internal email address?

Query 4: Are emails encrypted using appropriate encryption techniques?

Query 5: Are emails containing customer confidential information deleted from a sent folder and any other locally stored personal storage table (PST) files after the business need has been completed?

Query 6: Is this a Voice Process (e.g., involving customers/partners communication over the phone, such as, for example, Collection, Activation, or the like)?

Query 7: Does any phone conversation with customers/partners contain customer confidential information (e.g., applicable to Voice Process)?

Query 8: Is a conversation with a customer, containing confidential information, being recorded (e.g., using Voice call recording tools?

Query 9: Is access to recorded customer calls restricted to employees based on justified business need?

Query 10: Is the process able to download Audio Files containing customer confidential information from a Voice call recording system for your business operations?

Query 11: Where are the downloaded audio files stored? (e.g., Local Desktop, Shared/Network folder, or the like)

Query 12: Is there any requirement in the process to replay a recorded call (e.g., Quality/Training purpose)?

Query 13: Are recorded calls accessible only to certain individuals?

Query 14: Are screenshots (e.g., of an application containing customer confidential data) being captured during call recording?

In the example shown in FIG. 3, the queries 304 may be selected so as to gather information pertaining to information security. For example, the queries 304 may be directed towards procedures for protecting information. The answers received in response to the queries may then be used to assess risk associated with a particular process or data handling scheme. In some implementations, the queries 304 may be selected from a query database. For example, referring to FIG. 1, the computing device 101 may access a query database stored within the database 121 or in an external database in communication with the computing device 101. The computing device 101 may select a number of queries from the query database. The computing device 101 may then provide the selected queries to the computing device 151 for presentation to a user of the computing device 151 as part of the GUI 300. In some implementations, a user who is filling out the form 302 may pause midway through answering the queries, save the results entered so far, and resume filling out the form 302 at a subsequent time. The partially completed form 302 may be stored, for example, in memory of the computing device 151 or the computing device 101.

In some implementations, the queries 304 may be selected from the query database so as to be related to a specific process. The selected queries 304 may include one or more general queries that are included for all processes which are being assessed, regardless of the type of process. In some implementations, a number of criteria may be used to identify queries that are tailored to a specific process. For example, each process environment may be associated with one or more inclusion filters that parse only selected ones of the queries 304 from the query database. The computing device 101 may apply the inclusion filters to the query database to retrieve queries based on one or more of operations type (e.g., credit card services, IT support, application development), platform used (e.g., database, server, application, voice, and the like), facility used (e.g., Internet, email, and the like), and the like. For example, if a particular process involves the handling or processing of customer social security numbers, the inclusion filters may identify queries related to the handling and security of social security numbers as being relevant to the process and included as part of the queries 304. In some instances, queries in the query database may be sequenced with regard to their relevance to a particular process or facility, and a predetermined number of queries may be selected for presentation as the queries 304 based on relevance of the subsequent queries to the earlier queries. In some instances, all queries that are identified as relevant may be selected for presentation as the queries 304. In some implementations, all of the queries in the query database may be selected for presentation. In some implementations, the same set of queries may be presented in conjunction with each Risk Assessment Query Form 302 without regard to relevance to a specific process or data handling scheme.

As mentioned previously, in some implementations, the queries 304 may be selected so as to elicit responses from a user that may be used to assess the risk associated with a particular process. The questions may, for example, be presented to a process owner or process manager for a particular process or set of processes. For example, query 304a asks if the network associated with a process includes firewall software. As another example, query 304b asks if wireless network communications are encrypted.

In an example, a process may relate to a voice process for banking business/support operations. This process may include credit card services, global wealth management customer care, and the like. In such an example, the following queries may be asked:

Query 1: Is this a Voice Process (e.g., involving customers/partners communication over the phone, for example, Collection, Activation, .and the like)?

Query 2: Do any phone conversations with customers/partners contain customer confidential information?

Query 3: Are conversations with customers, containing confidential information, being recorded (e.g., using Voice call recording tools?

Query 4: Is access to recorded customer calls restricted to employees based on Justified business need?

Query 5: Is the process able to download Audio Files containing customer confidential information from a Voice call recording system for business operations?

Query 6: Where are downloaded audio files stored?(e.g., Local Desktop, Shared/Network folder, or the like).

Query 7: Is there any requirement in the process to replay the recorded call? (e.g., Quality/Training purpose).

Query 8: Are recorded calls only accessible only to selected individuals?

Referring again to FIG. 3, queries 304 may be selected so as to elicit information regarding general information security, customer sensitive data handling, data classification, document security controls, information transfer channels, system and business application controls, and/or operational controls. The queries 304 may also be identified using requirements of information security baselines or standards, such as national or international data security standards. For example, queries may be identified or generated based on the Payment Card Industry Data Security Standard (PCI DSS) requirements. As another example, standards for electronic health care transactions as defined by Health Insurance Portability and Accountability Act (HIPAA) may be used to identify or generate queries. Other guidelines may be used when generating or identifying queries to include in the queries 304, such as industry best practices for a particular industry, or data privacy regulations. For example, queries may be generated or identified so as to comply with the UK Data Protection Act of 1998.

In the example shown, the queries 304 may be intended to elicit yes or no responses. In some implementations, some or all of the queries 304 may elicit responses other than yes or no responses. For example, the form 302 may include text boxes to allow a user to enter text in response to one or more of the queries 304. As another example, the form 302 may include sliding scales that allow users to indicate a number within a range in response to a one or more of the queries 304. For example, a query could ask a user to indicate on a scale of 1-10 the likelihood of employees accessing sensitive information for non-work related purposes.

In some implementations, the user responses may be provided to a processing device to be used for assessing risk associated with a process or set of processes. For example, referring to FIG. 1, the computing device 151 may display the form 302 to a user and collect responses from the user. The computing device 151 may then provide the user responses to the computing device 101 for further processing. As another example, the computing device 151 may use the user response information to assess a risk level associated with a process. In some implementations, the user responses may be reviewed to ensure accuracy prior to being used to assess a risk level. For example, a process owner may provide answers using the form 302, and a manager may review the answers provided by the process owner to ensure accuracy of the responses. Also, information security practitioners may validate the responses in some cases and analyze the information received through the queries to modify the outcome of the risk level.

In some implementations, weights may be associated with some or all of the queries 304. In some implementations, each query may be associated with a weight in the query database. In some implementations, weights may be assigned to the queries based on one or more factors. For example, the computing device 101 may select a number of queries from the query database for presentation as the queries 304. The computing device may assign weights to each of the selected queries based on the importance/relevance of that query to a particular process. For example, the query 304b may be associated with a weight of 2 for a first process and associated with a weight of 4 for a second process. In some implementations, the weights may be assigned on a scale of 1-20. In some implementations, the weights may be assigned on a scale of 1-10. In some implementations, the weights may be assigned on a scale of 1-6. In some implementations, another scale may be used for weighting queries. In some implementations, the weights may be the same for all types of risk, and, in some implementations, the weights may differ for each type of risk. In some implementations, some, but not all, types of risk may have the same weight. In some implementations, weights may not be required.

Figure 4:
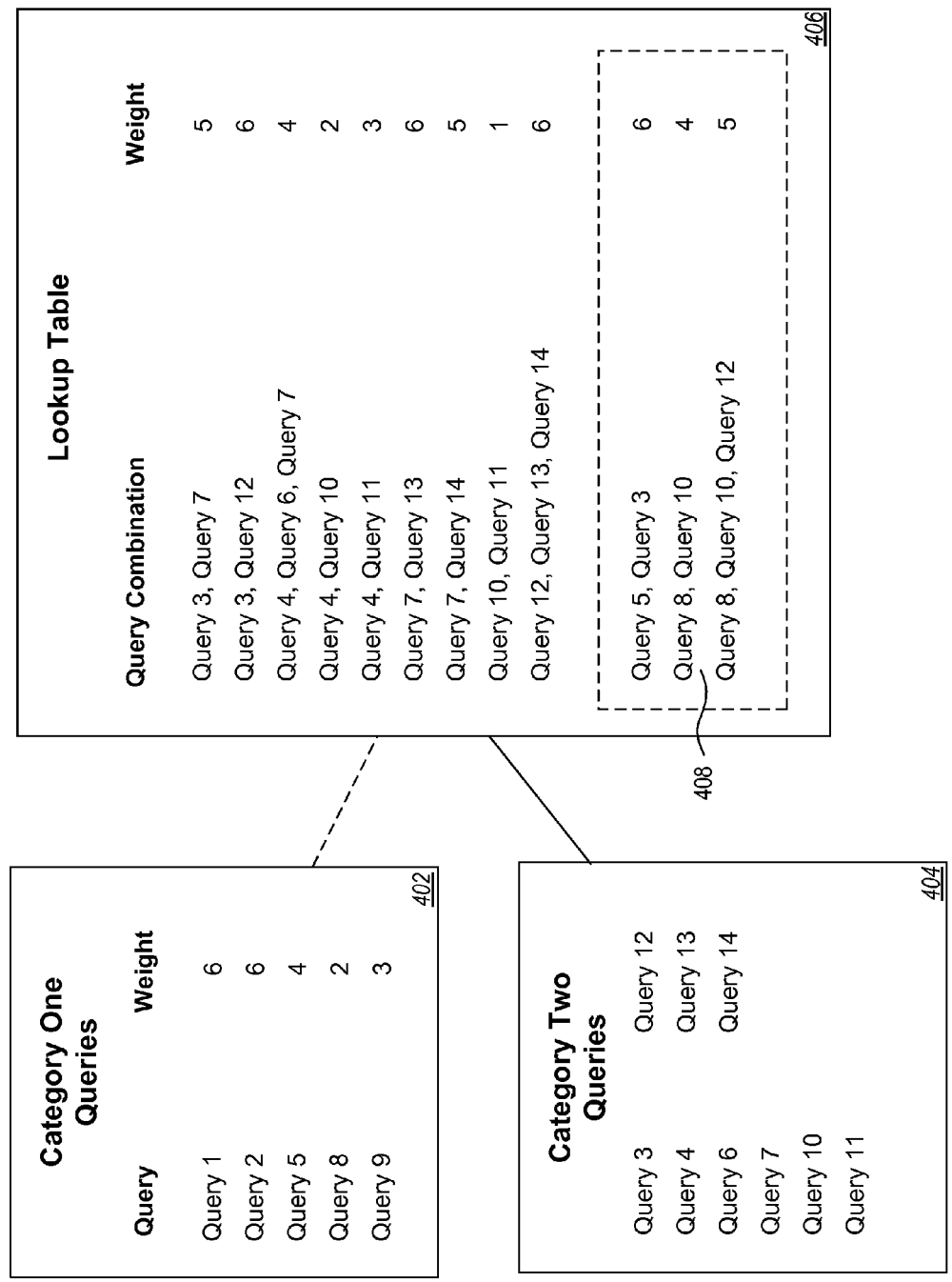
FIG. 4 illustrates an example categorization scheme for categorizing queries and associating weights with queries and query combinations in accordance with example embodiments.

Turning to FIG. 4, queries (e.g., the queries 304 from FIG. 3) may be grouped into two or more categories. The categories may be used to identify query responses, or combinations of query responses, that indicate situations which are used to derive risk associated with a process. In the example shown, the queries are separated into two categories. In the example shown, a table 402 displays category one queries. Category one queries may be identified as queries for which a particular response indicates a direct risk situation associated with a process without regard to other query responses. For example, a response of "no" in response to a question of "is there a firewall installed on the network" may be identified as a risk associated with a process. As another example, a response of "yes" to a query of "Do sub-manager level employees have access to customer social security numbers" could also be identified as a direct risk situation considering existing available information about their privileges. In some example implementations, if there is a sequence of related queries and if a response to a particular one of the queries is identified as a non-risk, then the subsequent queries in the sequence may also be identified as a non-risk.

Referring again to FIG. 4, category two queries are displayed in a table 404. The category two queries may be identified as queries for which an increased risk factor is only assigned when a particular response for a first query occurs in conjunction with a particular response for a second query (or in conjunction with particular responses for second and third queries, and the like). For example, table 404 identifies query 3 as a category two query. In some implementations, a lookup table 406 may identify query response combinations that lead to increased risk and identify weights for the query response combinations. The lookup table 406 (as well as the tables 402 and 404) may be stored, for example, in RAM 105 or ROM 107 of the computing device 101 of FIG. 1.

The below examples may be of category one queries which may independently indicate risk exposure.

Query 1. Has access control been applied on a shared/network folder (read/write/full control/modify) for ensuring access only to authorized associates and access are getting revoked from folder on transfer/attrition of an associate?

Query 2. Does the process store CVV/PIN data after the intended usage criteria is fulfilled?

The below examples may be of category two queries for which an increased risk factor is only assigned when a particular response for a first query occurs in conjunction with a particular response for a second query (or in conjunction with particular responses for second and third queries, and the like). In the below example, a response to Query 1 below does not independently pose any risk, but there is the potential for risk exposure when combined with Query 2 or 3.

Query 1. Is customer/associate confidential information sent over email to any external email address, including any vendors/contractors having an internal email address?

Query 2. Are these emails encrypted?

Query 3. Are emails containing customer confidential information deleted from sent folder and any other locally stored PST files after the business need is over?

Query 2 or 3, when combined with query 1, may increase the potential for risk exposure.

In another example, queries 1-4 below may not pose any risk independently, but may result in risk exposure when considered collectively.

Query 1: Is this a Voice Process (e.g., involving customers/partners communication over the phone, for example, Collection, Activation, and the like)?

Query 2: Whether any phone conversation with customers/partners contains customer confidential information (e.g., applicable to Voice Process)?

Query 3: Are conversations with customers, containing confidential information, being recordd (e.g., using Voice call recording tools?

Query 4: Is access to recorded customer calls restricted to employees based on justified business need?

In the example shown in FIG. 4, the lookup table 406 identifies query 3 and query 7 as a query combination for which a particular combination of responses (e.g., a yes answer to query 3, and a no answer to query 7) may be a risk-increasing combination. The lookup table 406 further identifies queries 4, 6, and 7 as a set of queries for which a particular combination of responses may be identified as risk-increasing. The lookup table 406 identifies the combination of queries 4, 6, and 7 as having a weight of 4. As discussed above, the weights may be predetermined, the weights may be assigned based on the relevance of queries (and query combinations) to a particular process, or weights may not be assigned.

In some implementations, the lookup table 406 may include query combinations that include one or more category one queries. For example, a category one query may be identified as being associated with a direct risk situation, and a weight may be associated with the category one query. The lookup table 406 may additionally identify a query combination that includes the category one query increases the weight associated with the query. For example, query 5 may be associated with a weight of 4 in table 402. The lookup table 406 may further associate a combination of query 5 with query 3 as having a weight of 6. As another example, table 402 indicates a weight of 2 associated with query 8. The lookup table 406 indicates an increased weight of 4 when a particular response for query 8 is combined with a particular response for query 10. Additionally, the lookup table 406 indicates an additional increase to a weight of 5 when particular risk-increasing responses to query 8 and query 10 are combined with a particular response to query 12.

Figure 5:
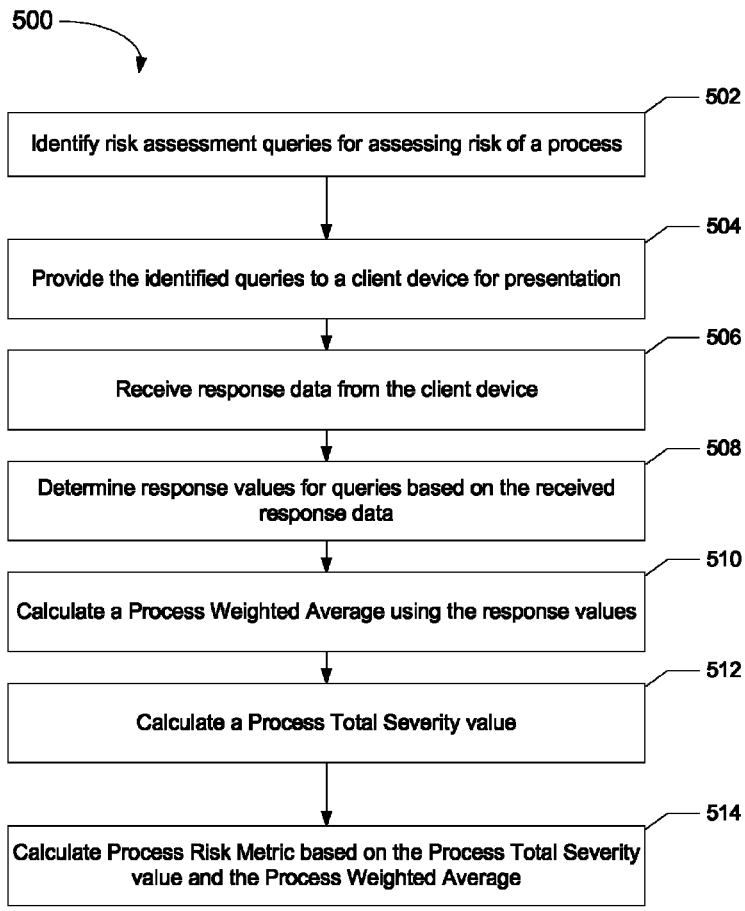
FIG. 5 is a flow diagram of an example method for collecting and assessing risk assessment information in accordance with example embodiments.

Turning now to FIG. 5, an example process 500 is shown for collecting and assessing risk assessment information in accordance with an example embodiment. The method may be implemented by the computing device 101, computer, or other apparatus. The order of the blocks depicted in FIG. 5 may be rearranged, one or more blocks may be repeated in sequential and/or non-sequential order, and/or one or more blocks may be omitted. Further, other blocks may be added to the flow diagram.

The process 500 may be used for identifying a risk factor associated with a process and may include a block 502 of identifying risk assessment queries for assessing risk of a process. For example, a plurality of queries may be stored in a database. The set of queries may be selected from the queries stored in the database. In some implementations, a number of criteria may be used to select queries that may be relevant to a particular process or set of processes. For example, a number of queries related to encryption of electronic communications may be selected as being relevant to a process that involves transfer of sensitive information between computing devices across one or more networks. The queries may be selected for presentation to a process owner to allow the owner to provide information related to risk management for a particular process or set of processes.

At block 504, the identified queries may be provided to a client device for presentation to a user. For example, referring to FIG. 1, the computing device 101 may provide the identified queries to the computing device 151 for presentation to a user of the computing device 151. In some implementations, the user may be the owner of the process for which risk is being assessed. In some implementations, the user may be a different employee associated with the process, or another user of the client device.

At block 506, response data may be received from the client device. For example, referring to FIG. 1, the computing device 101 may receive response data from the computing device 151. The response data may be query responses provided by the user in response to the queries presented by the client device.

At block 508, response values for queries may be determined based on the received response data. For example, a "Not Applicable" (NA) response, or a query for which no response is provided, may not be considered when calculating risk. As another example, a risk-increasing response may be identified for each query. For example, for the query "Is anti-virus software installed," a response of "No" may be identified as risk-increasing while a response of "Yes" may be identified as non-risk-increasing. In this example, if the response to the query is "No" (risk-increasing) the weight associated with the query may be assigned as the response value. For example, if the weight associated with the query is 5, a response value of 5 may be identified for the response of "No." If the response to the query is "Yes" (non-risk-increasing) a value of zero may be identified as the response value. In some implementations, a negative value may be identified for a non-risk-increasing response. In some implementations, a positive value that is less than the weight associated with a query may be identified as the response value for a non-risk-increasing response. As previously described, in some implementations, a particular response to a query will not be identified as risk-increasing unless a corresponding response to a second query also occurs.

The following provides an example of determining a response value based on a combination of queries for a process that involves use of email and processing of credit card information.

Query 1. Is customer/associate confidential information sent over email to any external email address, including vendors/contractors having an internal email address?

Response to Query 1—Yes

Query 2. Are these emails being encrypted?

Response to Query 2—No

Query 3. Are emails containing customer confidential information deleted from sent folder and any other locally stored PST files after the business need is over?

Response to Query 3—No

Query 4. Does the process store Credit Card CVV/PIN data after intended usage criteria is fulfilled.

Response to Query 4—Yes

Based on the response data, then a response value may be calculated as follows:

a) Query 1 and 2 (Email facility) combined together result in a risk scenario and, based on the response data, may be assigned an intermediate risk value of 1.

b) Query 3 (Email facility) may be a risk increasing query for point (a) and, based on the response data, may be assigned an intermediate risk value of 1.

c) Query 4 (Credit Card operations) is a question identifying an independent risk and, based on the response data, may be assigned an intermediate risk value of 1.

The response value for the process is a sum of the intermediate risk values, and may result in the response value being a)+b)+c)=1+1+1=3 for this process.

At block 510, a Process Weighted Average (PWA) may be calculated using the identified response values. The PWA may be calculated as the summation of each response value from a series of response values multiplied by the number of queries (or query combinations) associated with that response value (e.g., 5 times the number of queries (or query combinations) associated with a response value of 5) divided by the summation of the number of queries (or query combinations) associated with a non-zero or positive risk value (e.g., the number of queries (or query combinations) associated with a risk-increasing response). For example, if the series of response values is 1-6, the summations would occur across the range of 1-6. The equation for calculating Process Weighted Average may be represented as:

$$PWA = (\Sigma i^*(\text{No. of "i" Risk Response Values}))/(\Sigma(\text{No. of "i" Risk Response Values}))$$

where i=non-zero risk response values

In some implementations, the values of i range from 1-6. Using the above equation in an example, if there are two response values of 5 and one response value of 3 for a process, the PWA may be calculated as $$PWA = ((5*2)+(3*1))/(2+1) = 4.33$$

At block 512, a Process Total Severity (PTS) value may be calculated. The PTS may be calculated as the sum of all response values associated with a process. Following the above example where two response values of 5 and one response value of 3 is associated with a process, the PTS for the process may be calculated as $$PTS = 5+5+3 = 13$$

At block 514, a Process Risk Metric may be calculated based on the Process Total Severity value and the Process Weighted Average. The Process Risk Metric may be calculated as the sum of the Process Total Severity value and the Process Weighted Average for a process. In some implementations, Process Weighted Average and Process Severity value may be used selectively or not used at all, and Process Risk Metric may be calculated as mentioned in block 508. Following the above example, the Process Risk Metric for the process having two response values of 5 and one response value of 3 would be $$\text{Process Risk Metric} = 13 + 4.33 = 17.33$$

In some implementations, the blocks of the process 500 may be repeated for multiple processes or sets of processes to identify a process risk metric for each process or set of processes. The process risk metrics for multiple processes may be compared to make decisions related to the processes. For example, if several candidate processes are under consideration for adoption as a new process, the process risk metric may be used in selecting a process from the candidate processes (e.g., having a lowest process risk metric score). In an example, risk treatment of processes may be prioritized based on process risk metric scores. The process risk metrics may be used to identify processes that are in most need of attention and/or resources in order to reduce risk (e.g., identify one or more processes having the highest process risk metric scores). Resources may then be allocated to the highest risk processes to implement and/or revise controls to reduce the risk of the identified high risk processes. This may help to ensure that a finite amount of resources may be focused on the processes that most require these resources (e.g., processes that have the highest process risk metric scores).

In some implementations, the process 500 may include greater or fewer blocks than shown in the example in FIG. 5. For example, the process 500 may include an additional block of identifying a high risk process from among a set of processes using the process risk metric for the process. In another example, the process 500 may include an additional block of ranking processes (e.g., in ascending/descending order) based on their process risk metric scores. In some implementations, the blocks of the process 500 may be completed in a different order. For example, the Process Total Severity value may be calculated prior to the Process Weighted Average being calculated.

Aspects of the embodiments have been described in terms of illustrative embodiments thereof. Numerous other embodiments, modifications and variations within the scope review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

What is claimed is:

1. An apparatus comprising:
   at least one processor;
   a storage storing a plurality of risk assessment queries; and
   at least one memory storing computer executable instructions that, when executed by the at least one processor, cause the apparatus at least to:
      identify one or more risk assessment queries from the plurality of risk assessment queries for assessing risk of a process;
      provide the identified risk assessment queries to a device for presentation;
      receive response data from the device, the response data comprising responses to the identified risk assessment queries;
      determine response values for at least some of the identified risk assessment queries based on the received response data;
      calculate a process weighted average by taking a sum of a series of response values multiplied by a number of responses associated with each of the response values, and dividing the sum by a number of responses associated with a non-zero response value; and
      calculate a process risk metric for the process based on the determined response values by adding a process total severity value to the process weighted average.

2. The apparatus of claim 1, where the determining of the response values for at least some of the risk assessment queries includes:
   identifying a predetermined combination of two or more query responses; and
   determining a single response value based on the identified combination of two or more query responses.

3. The apparatus of claim 1, where the identifying of the risk assessment queries includes selecting a subset of risk assessment queries from the plurality of risk assessment queries based on relevance to the process.

4. A non-transitory computer-readable medium storing computer-executable instructions that, when executed, cause an apparatus at least to perform:
   identifying risk assessment queries for assessing risk of a process;
   providing the identified risk assessment queries to a client device;
   receiving response data from the client device, the response data comprising responses to the risk assessment queries;
   determining response values for at least some of the risk assessment queries; and
   calculating a process risk metric of the process by adding a process total severity value to a process weighted average.

5. The non-transitory computer-readable medium of claim 4, where the process weighted average is calculated by taking a sum of a series of possible response values multiplied by a number of responses associated with each of the response values, then dividing the sum by a number of responses associated with a positive response value.

6. The non-transitory computer-readable medium of claim 4, where the determining of the response values for at least some of the risk assessment queries includes:
   identifying a predetermined combination of two or more query responses; and
   determining a single response value based on the identified combination of two or more query responses.

7. The non-transitory computer-readable medium of claim 4, where the identifying of the risk assessment queries includes selecting a subset of risk assessment queries based on relevance to the process.

8. The non-transitory computer-readable medium of claim 4, where the risk assessment queries are selected so as to elicit responses relating to information security associated with the process.

9. The non-transitory computer-readable medium of claim 4, where each of the identified risk assessment queries is associated with a weight value used to identify at least some of the response values.

10. The non-transitory computer-readable medium of claim 4, where the instructions, when executed, cause the apparatus at least to further perform:
    comparing the calculated process risk metric to at least one additional process risk metric to identify a high risk process; and
    causing assignment of additional resources to the identified high risk process.

11. A method comprising:
    identifying risk assessment queries for assessing risk of a process;
    providing the identified risk assessment queries to a client device for presentation;
    receiving response data from the client device, the response data comprising responses to the risk assessment queries;
    determining, by at least one processor, response values for at least some of the risk assessment queries based on the received response data; and
    calculating, by the at least one processor, a process risk metric based on the determined response values, wherein calculating the process risk metric comprises adding a process total severity value to a process weighted average.

12. The method of claim 11, where the process weighted average is calculated by taking a sum of a series of possible response values multiplied by a number of responses associated with each of the response values, then dividing the sum by a number of responses associated with a positive response value.

13. The method of claim 11, where the determining of the response values for at least some of the risk assessment queries includes:
    identifying a predetermined combination of two or more query responses; and
    determining a single response value based on the identified combination of two or more query responses.

14. The method of claim 11, where the identifying of the risk assessment queries includes selecting a subset of risk assessment queries based on relevance to the process.

15. The method of claim 11, where the risk assessment queries are selected so as to elicit responses relating to information security associated with the process.

16. The method of claim 11, where each of the identified risk assessment queries is associated with a weight value, used to identify at least some of the response values.

17. The method of claim 11, further comprising:
    comparing the calculated process risk metric to at least one additional process risk metric to identify a high risk process; and causing assignment of additional resources to the identified high risk process.

* * * * *